United States Patent [19]

Su

[11] Patent Number: 5,432,231
[45] Date of Patent: Jul. 11, 1995

[54] RECYCLING STRETCH WRAP FILM

[75] Inventor: Tien-Kuei Su, Hillsborough, N.J.

[73] Assignee: Mobil Oil Corporation, Fairfax, Va.

[21] Appl. No.: 86,294

[22] Filed: Jul. 6, 1993

[51] Int. Cl.⁶ .............. C08L 23/00; C08L 25/04; C08L 51/04
[52] U.S. Cl. .................... 525/86; 525/210; 525/211; 525/240; 525/241; 428/903.3
[58] Field of Search ............ 525/86, 240, 210, 211; 521/40, 40.5, 47, 41; 428/903.3

[56] References Cited

U.S. PATENT DOCUMENTS

| | | | |
|---|---|---|---|
| 4,399,180 | 8/1983 | Briggs et al. | 428/212 |
| 4,418,114 | 11/1983 | Briggs et al. | 428/218 |
| 4,518,654 | 5/1985 | Eichbaur et al. | 428/331 |
| 4,565,847 | 1/1986 | Bahl et al. | 525/240 |
| 4,743,649 | 5/1988 | Dobreski | 525/86 |
| 4,786,678 | 11/1988 | Dobreski et al. | 525/240 |
| 4,804,564 | 2/1989 | Dobreski et al. | 525/240 |
| 4,820,589 | 4/1989 | Dobreski et al. | 428/422 |
| 4,826,920 | 5/1989 | Dobreski | 525/86 |
| 4,923,750 | 5/1990 | Jones | 428/349 |
| 4,963,388 | 10/1990 | Benoit | 427/29 |
| 4,985,498 | 1/1991 | Shirodkar | 525/86 |
| 4,996,094 | 2/1991 | Dutt | 428/212 |
| 5,019,315 | 5/1991 | Wilson | 264/171 |
| 5,041,501 | 8/1991 | Shirodkar | 525/240 |
| 5,085,927 | 2/1992 | Dohrer | 525/240 |
| 5,116,677 | 5/1992 | Jones | 428/349 |

*Primary Examiner*—James J. Seidleck
*Assistant Examiner*—Mark L. Warzel
*Attorney, Agent, or Firm*—A. J. McKillop; M. D. Keen

[57] ABSTRACT

Waste from stretch wrap films is recycled into non-blocking films useful as bags and liners as well as in food applications, by incorporating a polymer which contains cross-linked rubber particles, such as high impact polystyrene or an EPDM elastomer. The recycled films may include up to about 50 percent recycled stretch wrap with LLDPE and up to about 10 percent of the third polymer. The films may be single layer extrusions or multi-layer (A/B, A/B/A) coextrusions.

20 Claims, No Drawings

RECYCLING STRETCH WRAP FILM

FIELD OF THE INVENTION

This invention relates to the recycling of plastic film material, both as manufacturing scrap as well as to the recycling of Post Consumer Material (PCM).

BACKGROUND OF THE INVENTION

Stretch wraps have been used widely in household and institutional packaging applications. The usage of stretch wrap, now made almost exclusively from LLDPE (Linear Low Density Polyethylene), is growing; the worldwide consumption for stretch wrap was well over 1 billion lbs. in 1991.

It is important for stretch wrap films to adhere to the objects and to each other during overwrapping. To achieve this, the film may be made of a polymer composition which has the desired properties, for example, copolymers of ethylene and vinyl acetate or vinyl chloride. With films made from LLDPE polymers a cling additive such as PIB (polyisobutylene) or amorphous atactic polypropylene, is usually incorporated into the film material; this additive migrates to the surface of the film where it modifies the film properties to achieve the desired overwrap characteristics. Quantitatively, the requisite degree of cling may be measured by the test procedure set out in ASTM D903-49 "Test for Peel Strength of Adhesives". Flexible films having a cling strength from 0.15 to 0.4 cm.-g. are generally considered to possess adequate cling, while values between 0.2 and 0.3 cm.-g. are normally considered to represent superior cling characteristics. Other important properties include elasticity, clarity, and stretchability and strength to withstand high speed wrapping.

Stretch wrap films may be either one-layer films or, more preferably, two or three-layer laminated materials produced by co-extrusion. Co-extruded films may have differing properties on the two sides, for example, to maximize the cling characteristics on the inside of the wrapped package while minimizing the degree of cling to other wrapped packages. A co-extruded stretch wrap film of this kind with a high degree of cling on one side and a sliding characteristic on the other is described in U.S. Pat. No. 4,518,654 (Eichbauer). Another film of this type is described in U.S. Pat. No. 4,820,589 (Dobreski), this film having an additive such as a polyamide or a poly-fluoro-olefin to reduce the cling characteristics on one side of the film. Another one-sided Cling stretch wrap film is described in U.S. Pat. No. 4,963,388 (Benoit).

U.S. Pat. No. 4,399,180 describes an improved type of stretch wrap film in which a primary layer of LLDPE is coextruded with a layer on one or both sides of a highly branched low-density polyethylene made in a free-radical polymerization process. As described in the patent, these films offer improved resistance to tear in both the machine and transverse directions as well as improved toughness and elongation characteristics. U.S. Pat. No. 4,418,114 (Briggs) describes similar types of film in the form of three-layer laminates and U.S. Pat. No. 5,019,315 (Wilson) describes another coextruded three-layer stretch wrap film fabricated from a high density polyethylene core layer and LLDPE outer layers.

Reprocessing stretch wrap waste back into the original products causes deterioration in the properties of the film products, especially in the optical quality, stretchability and strength of the films. For this reason, stretch wrap film is not normally recycled to product of the same type. On the other hand, recycling stretch wrap waste for bag applications is limited because the tackifiers, such as PIB, tend to cause the bags to block. Thus, stretch wrap film is not readily recycled into bag type film nor into films for other applications where it might otherwise have potential, for example, liners and food applications. The problem is particularly troublesome with bag films because the blocking characteristic impedes the separation of the film layers and the opening of the bag.

SUMMARY OF THE INVENTION

We have now devised a way of recycling stretch wrap film waste, particularly post-consumer material (PCM) into a film blend which exhibits low blocking characteristics and which is suitable as a bag film and for other applications including container liners.

According to the present invention, stretch wrap film waste may be recycled into useful film material with reduced blocking characteristics with the use of a polymer which contains a cross-linked rubber. Normally, up to about 40 weight percent of stretch wrap film waste can be blended with LLDPE film material by incorporating 1 to 5% of a polymer containing crosslinked rubber particles.

DETAILED DESCRIPTION

Scrap from stretch wrap film is recycled into blends which may be used for various purposes where good resistance to blocking is desired, for example, for bags, liners and possibly food applications. The present recycled blends are particularly useful for bag manufacture because the films made from them have good toughness, break, elongation and resistance to tearing. The scrap which is blended may be either manufacturing scrap or Post Consumer Material (PCM).

The stretch film scrap is blended with linear low density polyethylene (LLDPE), with the addition of a polymer which contains particles of cross-linked rubber. The scrap may comprise as much as one half (50 weight percent) of the blend but normally not more than 40 weight percent will be used; in most cases, the minimum amount of stretch film scrap will be 10 weight percent, with 20 or 25 to 40 percent representing the normal range of inclusion.

The stretch film scrap is recovered from stretch films, that is films which are useful for the overwrapping of articles, as described above. The stretch films may be of the unitary (one layer) type or, alternatively, may be two or three-layer materials. The unitary films typically have a cling additive present in order to confer the desired cling properties. Suitable additives include polyisobutylenes, for example, polyisobutylenes having a number average molecular weight from about 1,000 to 3,000 (measured by vapor phase osmometry), amorphous atactic polypropylene, for example, an amorphous polypropylene having a number average molecular weight of 2,000, as well as other cling additives such as polyterpenes and ethylene/vinyl acetate copolymers containing about 5 to 15 weight percent vinyl acetate units. The cling additive is typically used in an amount from 0.5 to about 10 pounds per 100 pounds of the base resin, with the exact amount selected according to the degree of cling desired in the film product. As noted above, the cling may be measured by the ASTM D903-

49 test, with values of at least 0.15 cm.-g. being suitable, normally from 0.15 to 0.4, preferably 0.2 to 0.3 cm.-g. In addition, the stretch wrap film typically has an elongation of 50 to 400 percent.

The base polymer for the stretch wrap film is preferably linear low density polyethylene (LLDPE). LLDPE is conventionally manufactured as a copolymer with a lower alpha-olefin ($C_4$-$C_{10}$) co-monomer such as hexene or octene, normally present in an amount from 1 to 10 weight percent of the copolymer. The density of the LLDPE is usually in the range of 0.905 to 0.940 g./cc. and the melt index from 1 to 10. Preferred LLDPE polymers are those which have a density from about 0.917 to 0.925 g./cc. and a melt index from 2 to 5. LLDPE materials are described in greater detail in U.S. Pat. Nos. 4,518,654; 4,076,698; 4,205,021 and 4,963,388, to which reference is made for a more detailed description of these polymeric materials.

The stretch wrap films may be made as unitary (one layer) film or as coextruded films with either two or three layers. One layer films are described, for example, in U.S. Pat. Nos. 3,986,611 (Dreher); 4,222,913 (Cooper); 4,367,256 (Biel) and 4,680,330 (Berrier). In the case of a two layer extrudate, one layer will have cling properties while the other possesses no cling or a reduced cling characteristic in order to reduce adherence to other wrapped packages. Films of this kind are described in U.S. Pat. Nos. 4,518,644 (Eichbauer); 4,436,788 (Cooper); 4,588.650 (Mientus) and 4,820,589 (Dobreski). Three layer coextrusions are described, for example, in U.S. Pat. Nos. 4,399,180 (Briggs); 4,418,114 (Briggs);4,996,094 (Dutt) and 5,019,315 (Wilson). Additives may be included in the film or on it to confer slip properties where these are required in an anisotropic film. Films of this kind are described in U.S. Pat. Nos. 4,833,017 (Benoit) and 4,963,388 (Benoit).

The scrap from the stretch wrap films is formed into a blend with the LLDPE with the addition of a polymer which contains cross-linked rubber particles. The preferred polymers of this class are the high impact polystyrenes (HIPS). High impact polystryenes are available commercially from many different sources. They are usually produced by the bulk poymerization of a rubber solution in styrene monomer during which the rubber becomes incorporated into a polystyrene matrix in the form of discrete particles. The rubber particles become cross-linked to some extent during the polymerization besides graft formation occurring between the rubber and the styrene, to form the final reinforced structure of cross-linked rubber particles in the matrix. The amount of rubber is typically from 3 to 10 weight percent with the preferred rubbers being the butadiene rubbers. The size of the rubber particles in typically from about 0.5 to 10 $\mu$, with most polymers having the particles in the range of 1 to 5 $\mu$. The HIPS polymers with smaller rubber particles below about 5$\mu$ has been found to give the best results but satisfactory reduction in the blocking tendency may be achieved with larger particles.

Another type of additive polymer which may be used is the thermoplastic elastomers such as the polypropylene/EPDM elastomers which contain EPDM rubber particles in a polymer matrix. Propylene and ethylene may be copolymerised to form non-crystalline polymer products which have rubber-like behavior and are relatively chemically inert because of their saturation. To develop elstomeric properties, these copolymers are generally vulcanized (cross-linked) by the use of peroxides, radiation or traditional cross-linking agents such as sulfur. To gain sites for cross-linking, a diene monomer is often added; the resulting terpolymers are known as ethylene-propylene-diene (EPDM) elastomers. The EPDM elastomers may be compounded with other polymers such as polyethylene and polypropylene to form elastomeric polymer blends which may be used in the present process. Materials of this type, containing cross-linked rubber particles, which may be used in the present process are commercially available, for example, as the Santoprene TM elastomers sold by Monsanto.

The amount of the rubber-containing polymer which is used in the blend is typically from about 2 to 10 weight percent of the entire blend. The use of higher amounts of the rubber-containing polymer, e.g. from 5 to 10 weight percent, is desirable as the amount of blended scrap stretch wrap increases up to the normal maximum of about 40 to 50 weight percent, especially when the amount of the scrap exceeds about 25 percent.

The blends may be fabricated into products where a low blocking characteristic is desirable, for example, into bags, liners as well as for other applications, including food films. The blends normally have an induced blocking value (ASTM D 3354, 60° C./24 hrs.) of not more than 130 g., in contrast to values of at least about 130 g. when the rubber-containing polymer is absent. In most cases the induced blocking value will be not more than 100g. and preferably not more than 80 g., making the blends satisfactory for applications of the types described. The blends may be made into single and multi-layer films for use in various types of product.

EXAMPLES 1-4

The resins used in this study were:

LLDPE :LLDPE, Mobil NTA-261, Melt Index 1, Density 0.918

HIPS 1 : High Impact Polystyrene, Mobil PS7800, 8.7% rubber particles of 0.7 $\mu$, Melt Flow 3.6, Hardness 55.

HIPS 2 : High Impact Polystyrene, Mobil PS4600, 7.8% rubber particles of 4 $\mu$, Melt Flow 3.1, Hardness 50.

TPE Thermoplastic Elastomer, Santoprene TM 201-55, Monsanto thermoplastic elastomer of PP/EPDM, Density 0.97, Hardness 55A.

SFS Stretch Film Scrap comprising a mixture of stretch wrap films, typically LLDPE-based films, Melt Index 1 to 3, density 0.917–0.920.

Laboratory masterbatches containing 20% of the rubber containing materials were prepared on a ¾" (18 mm) Brabender TM extruder. The films were fabricated on the Brabender extruder equipped with an annular die having a diameter of 1½ (38 mm) and gap of 40 mils to form 1 mil films, using a melt temperature of 230° C.

LLDPE films containing stretch film scrap exhibit blocking as demonstrated by the induced blocking test (ASTM D3354). The induced blocking increases with the amount of stretch film scrap incorporated as shown in Table 1.

TABLE 1

| Effect of Stretch Film Scrap (SFS) on Blocking of LLDPE | | | |
|---|---|---|---|
| Ex. | Resin | Blend Ratio | Induced Blocking, g |
| 1 | LLDPE | — | 131 |
| 2 | LLDPE/SFS | 90/10 | 134 |
| 3 | LLDPE/SFS | 75/25 | 143 |

TABLE 1-continued

Effect of Stretch Film Scrap (SFS) on Blocking of LLDPE

| Ex. | Resin | Blend Ratio | Induced Blocking, g |
|---|---|---|---|
| 4 | LLDPE/SFS | 60/40 | 153 |

Up to a 10% level of stretch wrap, the blocking problem is maintained within tolerable limits; the induced blocking increases only slightly over the control. Bags of film made from blends containing 10% of stretch wrap recycle showed acceptable but consistent blocking characteristics. At a higher level of stretch wrap (above 10%), however, it is necessary to eliminate the blocking problem for bag applications.

EXAMPLES 5-13

The addition of a thermoplastic elastomer (TPE) with vulcanized rubber particles and or a high impact polystyrene significantly mitigates the blocking problem. In Examples 5-13, films were fabricated in the same way as described in Examples 1-4 above, using blends containing the rubber-containing polymers. The induced blocking values are shown in Table 2 below:

TABLE 2

Antiblocking Properties of Terblends Containing Stretch Film Scrap

| Ex. | Resin | Blend Ratio | Induced Blocking, g |
|---|---|---|---|
| 5 | LLDPE | — | 131 |
| 6 | LLDPE/SFS/HIPS 1 | 74.0/25.0/1.0 | 115 |
| 7 | LLDPE/SFS/HIPS 1 | 72.5/25.0/2.5 | 68 |
| 8 | LLDPE/SFS/HIPS 1 | 57.5/40.0/2.5 | 73 |
| 9 | LLDPE/SFS/HIPS 1 | 55.0/40.0/5.0 | 44 |
| 10 | LLDPE/SFS/TPE | 73.8/25.0/1.2 | 93 |
| 11 | LLDPE/SFS/TPE | 72.5/25.0/2.5 | 59 |
| 12 | LLDPE/SFS/TPE | 58.8/40.0/1.2 | 105 |
| 13 | LLDPE/SFS/TPE | 57.5/40.0/2.5 | 64 |

The results in Table 2 above show that the addition of the rubber-containing polymers significantly reduce the blocking values of the film blends to acceptable levels, even at high loadings of the stretch film scrap.

EXAMPLES 14-23

Films compounded on a Banbury compounder were produced on a 2½ (58 mm).

Sterling blown film line and the blocking tested. The results are summarized in Table 3.

TABLE 3

Antiblocking Properties of Terblends Containing Stretch Film Scrap

| Ex. | Opening Resin | Blend Ratio | Induced Blocking, g at 60° C./24 hrs | Bag Rating at 60° C./ 6 Days |
|---|---|---|---|---|
| 14 | LLDPE | — | 138 | 5 |
| 15 | LLDPE/SFS | 90/10 | 150 | — |
| 16 | LLDPE/SFS | 75/25 | 160 | 10 |
| 17 | LLDPE/SFS | 60/40 | 167 | 20 |
| 18 | LLDPE/SFS/HIPS 1 | 73/25/2 | 65 | 3 |
| 19 | LLDPE/SFS/HIPS 1 | 58/40/2 | 69 | 4 |
| 20 | LLDPE/SFS/HIPS 1 | 55/40/5 | 37 | 1 |
| 21 | LLDPE/SFS/TPE | 73/25/2 | 57 | 2 |
| 22 | LLDPE/SFS/TPE | 58/40/2 | 68 | 4 |
| 23 | LLDPE/SFS/TPE | 55/40/5 | 33 | 1 |

These results confirm that blending a small quantity of a third polymeric material containing rubber particles can overcome the blocking problem at high scrap loadings.

EXAMPLES 24-32

The incorporation of the polymeric antiblock additive has little detrimental effect on the physical properties of the films as shown in Table 4. The results are for blends of the LLDPE with the two different HIPS polymers.

TABLE 4

Physical Properties of LLDPE/Stretch Film Blends

| Ex. Property/compn. No. | 24 F1 | 25 F2 | 26 F3 | 27 F4 | 28 F5 | 29 F6 | 30 F7 | 31 F8 | 32 F9 |
|---|---|---|---|---|---|---|---|---|---|
| Break Str. × $10^3$ psi | | | | | | | | | |
| M | 7.1 | 5.8 | 5.9 | 5.5 | 5.7 | 5.8 | 6.2 | 5.1 | 5.5 |
| T | 5.5 | 4.9 | 3.6 | 4.5 | 3.8 | 4.4 | 4.1 | 4.3 | 3.5 |
| Break % | | | | | | | | | |
| M | 650 | 706 | 720 | 730 | 752 | 760 | 700 | 708 | 730 |
| T | 944 | 908 | 890 | 927 | 900 | 906 | 910 | 884 | 882 |
| Break Elong. in-lb. | | | | | | | | | |
| M | 41 | 44 | 41 | 43 | 47 | 45 | 38 | 39 | 41 |
| T | 45 | 39 | 38 | 41 | 35 | 36 | 39 | 37 | 33 |
| Toughness $10^6$ psi | | | | | | | | | |
| M | 18 | 20 | 19 | 20 | 19 | 20 | 20 | 19 | 16 |
| T | 22 | 20 | 18 | 19 | 18 | 18 | 19 | 18 | 17 |
| Tear g/mil | | | | | | | | | |
| M | 377 | 308 | 272 | 279 | 362 | 268 | 235 | 249 | 207 |
| T | 819 | 719 | 634 | 742 | 732 | 690 | 712 | 712 | 611 |

| Blend Compositions | | |
|---|---|---|
| F1 | 100/0/0 | LLDPE/SFS |
| F2 | 75/25/0 | LLDPE/SFS |
| F3 | 60/40/0 | LLDPE/SFS |
| F4 | 73/25/2 | LLDPE/SFS/HIPS 1 |
| F5 | 58/40/2 | LLDPE/SFS/HIPS 1 |
| F6 | 55/40/5 | LLDPE/SFS/HIPS 1 |
| F7 | 73/25/2 | LLDPE/SFS/TPE |
| F8 | 58/40/2 | LLDPE/SFS/TPE |
| F9 | 55/40/5 | LLDPE/SFS/TPE |

EXAMPLES 33-36

Using a HIPS with larger rubber particles can save material cost. To investigate the effectiveness of HIPS containing larger rubber particles, two types of HIPS were used: HIPS 2 with an average rubber particle size of 4 microns and HIPS 1 with an average particle size of 0.7 microns.

Films made from the blends set out in Table 5 below were tested for the induced blocking. The films were 1 mil films made in the manner described in Example 1. The results, including the previous results of Examples 18–20, using HIPS 1 for comparison are summarized in Table 5.

TABLE 5

Effect of Rubber Particle Size On Blocking Properties of Terblend Systems

| Ex. | Resin | Composition | Induced Blocking, g |
|---|---|---|---|
| 18 | LLDPE/SFS/HIPS 1 | 72.5/25.0/2.5 | 68 |
| 19 | LLDPE/SFS/HIPS 1 | 57.5/40.0/2.5 | 73 |
| 20 | LLDPE/SFS/HIPS 1 | 55.0/40.0/5.0 | 44 |
| 33 | LLDPE | — | 131 |
| 34 | LLDPE/SFS/HIPS 2 | 72.5/25.0/2.5 | 108 |
| 35 | LLDPE/SFS/HIPS 2 | 57.5/40.0/2.5 | 122 |
| 36 | LLDPE/SFS/HIPS 2 | 55.0/40.0/5.0 | 101 |

The results show that blending a small quantity (2.5 to 5%) of a third polymeric material containing rubber particles can mitigate blocking problems, but that to reduce blocking, the HIPS with larger rubber particles is not as effective as HIPS with smaller ones.

EXAMPLES 37–44

Coextruded films with a cling layer on one side only (A/B films) were produced and the blocking characteristics measured.

TABLE 6

Blocking Properties of Coextruded Films Containing Stretch Film Scrap

| Ex. | Layer Structure | Composition | Induced Blocking g |
|---|---|---|---|
| 37 | Inner Layer, 80% | LLDPE/SFS 90/10 | 131 |
| 38 | Outer Layer, 20% | LLDPE/SFS 90/10 | 134 |
| 39 | Inner Layer, 80% | LLDPE/SFS 90/10 | 130 |
| 40 | Outer Layer, 20% | LLDPE/SFS/TPE 89/10/1 | 96 |
| 44 | Inner Layer, 80% | LLDPE/SFS 80/20 | 140 |
| 42 | Outer Layer, 20% | LLDPE/SFS/TPE 77.5/20.0/2.5 | 75 |
| 43 | Innter Layer, 80% | LLDPE/SFS 60/40 | 144 |
| 44 | Outer Layer, 20% | LLDPE/SFS/TPE 55/40/5 | 45 |

The results of the induced blocking test are shown in Table 6. It definitely shows that a thin skin layer containing this terblend system is effective in alleviating blocking.

We claim:

1. A method of recycling stretch wrap film into blends with reduced blocking characteristics, which comprises blending the recycled stretch wrap film with a linear low density polyethylene (LLDPE) base polymer and an additive polymer which contains cross-linked rubber particles to form a blend which comprises from 10 to 40 weight percent of the recycled stretch wrap film, from 50 to 90 weight percent LLDPE and from 2 to 10 weight percent of the additive polymer and having an induced blocking value not greater than 130 g. at 60° C. for 24 hours.

2. A method according to claim 1 in which the additive polymer which contains cross-linked rubber particles is a high impact polystyrene.

3. A method according to claim 2 in which the high impact polystyrene contains cross-linked rubber particles having a size up to about 5 $\mu$.

4. A method according to claim 3 in which the high impact polystyrene contains from about 3 to 10 weight percent of cross-linked rubber particles.

5. A method according to claim 1 in which the additive polymer which contains cross-linked rubber particles comprises an ethylene-propylene-diene elastomer.

6. A method according to claim 1 in which the additive polymer which contains cross-linked rubber particles comprises a polymer containing cross-linked particles of an ethylene-propylene-diene rubber.

7. A method according to claim 6 in which the additive polymer which contains cross-linked rubber particles comprises a blend of polypropylene containing cross-linked particles of an ethylene-propylene-diene rubber.

8. A method according to claim 1 in which the blend of the recycled stretch wrap film, the base polymer and the additive polymer has an induced blocking value not greater than 100 g. at 60° C. for 24 hours.

9. A method according to claim 8 in which the blend of the recycled stretch wrap film, the base polymer and the additive polymer has an induced blocking value not greater than 80 g. at 60° C. for 24 hours.

10. A method according to claim 1 in which the stretch wrap film has a peel strength of from 0.2 to 5 cm.-g. and includes a polyisobutylene, an atactic polypropylene or a terpene as a cling additive.

11. A method according to claim 1 in which the recycled stretch wrap film is post consumer recycled film.

12. A polymer blend of recycled stretch wrap film which comprises:
   1. From 10 to 40 weight percent of the blend of recycled stretch wrap film,
   2. From 2 to 10 weight percent of the blend of an additive polymer which contains cross-linked rubber particles, and
   3. From 50 to 90 weight percent of linear low density polyethylene (LLDPE), the film having an induced blocking value of not more than 130 g. at 60° C. for 24 hours.

13. A polymer blend according to claim 12 in which the additive polymer which contains cross-linked rubber particles is a high impact polystyrene.

14. A polymer blend according to claim 12 in which the amount of recycled stretch wrap film in the blend is from 20 to 40 weight percent of the blend.

15. A polymer blend according to claim 13 in which the high impact polystyrene contains cross-linked rubber particles having a size up to about 5$\mu$.

16. A polymer blend according to claim 13 in which the high impact polystyrene contains from about 3 to 10 weight percent of cross-linked rubber particles.

17. A polymer blend according to claim 12 in which the blend of the recycled stretch wrap film, the base polymer and the additive polymer has an induced blocking value not greater than 80 g. at 60° C. for 24 hours.

18. A polymer blend according to claim 12 in which the blend of the recycled stretch wrap film, the base polymer and the additive polymer has an induced blocking value not greater than 80 g. at 60° C. for 24 hours.

19. A polymer blend according to claim 12 in which the stretch wrap film has a peel strength of from 0.2 to 5 cm.-g. and includes a polyisobutylene, an atactic polypropylene or a terpene as a cling additive.

20. A polymer blend according to claim 12 in which the recycled stretch wrap film is post consumer recycled film.

* * * * *